INVENTORS
DONALD W. NUSBAUM
NILS C. NEKLASON

ATTORNEY

Dec. 21, 1965  D. W. NUSBAUM ETAL  3,224,339
METHOD AND APPARATUS FOR CUTTING TOPOGRAPHIC MODELS
Filed Dec. 16, 1963  2 Sheets-Sheet 2
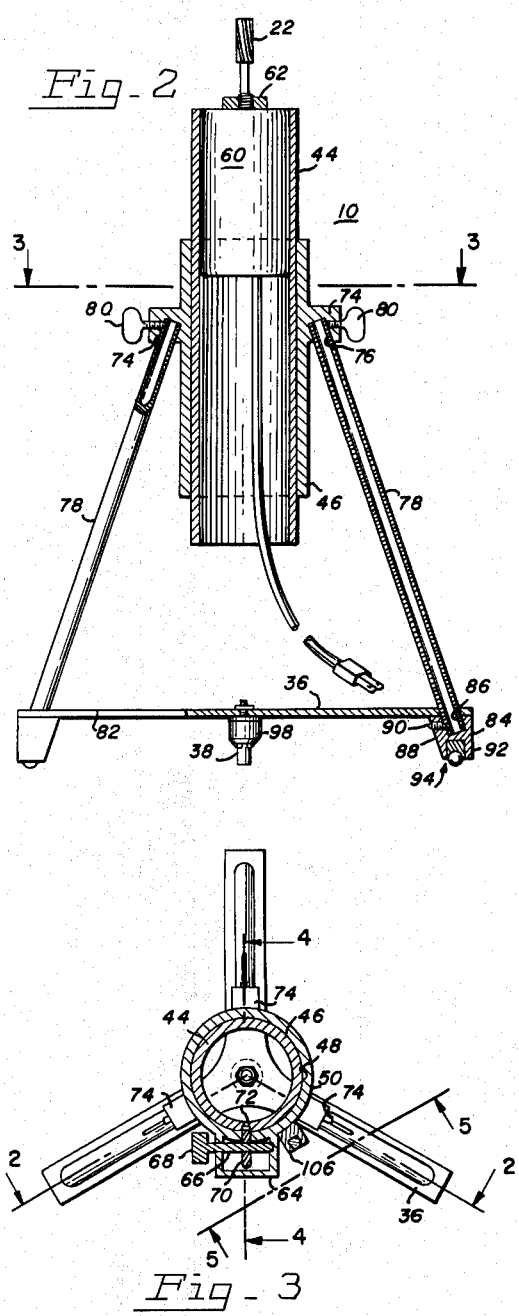
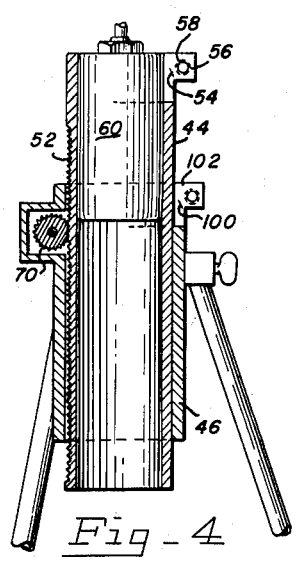
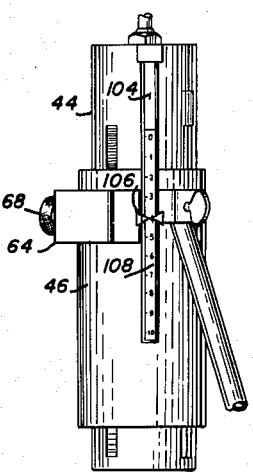
INVENTORS
DONALD W. NUSBAUM
NILS C. NEKLASON
BY
ATTORNEY

United States Patent Office 3,224,339
Patented Dec. 21, 1965

3,224,339
METHOD AND APPARATUS FOR CUTTING TOPOGRAPHIC MODELS
Donald W. Nusbaum, Palo Alto, Calif. (1429 San Marcos Circle, Mountain View, Calif.), and Nils C. Nekalson, 2850 Illinois Ave., East Palo Alto, Calif.
Filed Dec. 16, 1963, Ser. No. 330,696
8 Claims. (Cl. 90—13.1)

The present invention relates generally to the preparation of three dimensional terrain models and more particularly to an improved method and apparatus for cutting topographical models from information derived from planar contour maps.

Prior methods for developing or cutting topographical models from planar contour maps necessitated the utilization of expensive and bulky cutting stations on which no other work than the preparation of topographical models could be performed and which do not lend themselves to be disassembled, either for storage or for utilization of parts thereof for other work. Further, the contour map from which the topographical model is to be cut has to be reproduced as a negative or reverse print and which, after use, is usually discarded as having no other utility.

Further, the relative height between the work piece out of which the model is cut and the tool bit, for each successive contour line to be cut, required careful and often very inconvenient measuring methods for assurance that the set height reflected accurately the height represented by the next contour line. In prior art devices, the adjustment of the relative tool bit height slowed down the preparation to topographical models thereby increasing the expense of their preparation as well as requiring skilled operators for manning the machine.

Most devices used heretofore for cutting topographical models from information provided by planar contour maps of the type which trace each contour line utilize a pair of substantially parallel surfaces respectively guiding or clamping the work piece and/or the cutting tool. To trace the contour line, either one platform is movable parallel to the other in which case the work piece and the cutting tool are clamped to opposite platforms, or either the work piece or the cutting tool is movable over one platform while the other is clamped to the other platform. The movable part is utilized to trace the contour line. Cutter height is adjusted for each successive contour line by changing the platform separation. Each of these arrangements require that the parallel platforms be assembled into a unitary structure so that accurate height control can be provided.

It is therefore a primary object of this invention to provide a more simplified method and apparatus for cutting topographical models from a planar contour map.

It is a further object of this invention to provide a method of cutting topographical models utilizing a positive print of the planar contour map.

It is another object of this invention to provide a movable cutting apparatus for cutting topographical models from a contour map which is light, easily disassembled, and which includes adjustment means for raising and lowering the tool bit in relation to cutting apparatus.

It is still another object of this invention to provide a method and an apparatus for the cutting of topographical models from contour maps utilizing a pair of unconnected parallel platforms, one of which may comprise a movable table and the other a stationary suspended work piece holder, and which further includes a router structure having a control mechanism for raising and lowering the tool bit in accordance with a contour.

It is another object of this invention to provide a station for cutting topographical models from a positive print of a planar contour map utilizing a "light" table which is conveniently moved under a suspended or cantilevered support holding the work piece and in which a collapsible router device is movable over the light table upon whose surface the contour map is placed.

It is a still further object of this invention to provide a method and apparatus for cutting topographical models from planar contour maps which requires machinery occupying much less floor space and costing less money than was heretofore possible and which may be operated by unskilled operators and which therefore results in the production of less expensive topographical models.

Briefly, in accordance with this invention, there is provided an apparatus for cutting a topographical model from a planar contour map having a pair of telescoping sleeves axially movable with respect to one another by rack and pinion arrangement. The router motor carrying the tool bit is affixed to one sleeve while the leg structure with ball casters is affixed to the other sleeve.

A cantilevered or suspended structure, defining an upper parallel platform, is holding the work piece to be cut into a topographical model and a light table is moved under the work piece. The positive print of a contour map is placed, face down, over the light table and the cutting apparatus is placed on top of the contour map. A stylus axially aligned with the tool bit is affixed to the leg structure and the cutting apparatus is moved so that the stylus traces the contour line.

In moving to an adjacent contour line, the rack and pinion arrangement is utilized for raising or lowering the tool bit in accordance with the height separation defined by adjacent contour lines. A scale affixed to the one sleeve and a hair line affixed to the other sleeve and overlying the scale provide a convenient means for adjusting the height of the tool bit in accordance with the separation between adjacent contour lines.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIG. 2 is a cross sectional view of the cutting apparatus of FIG. 1 taken along line 2—2 of FIG. 3;

FIG. 3 is a cross section view taken along line 3—3 of FIG. 2;

FIG. 4 is a fractional cross section view taken along line 4—4 of FIG. 3; and

FIG. 5 is a partial front elevation view showing details of the height adjustment indicating means.

Figure 1:
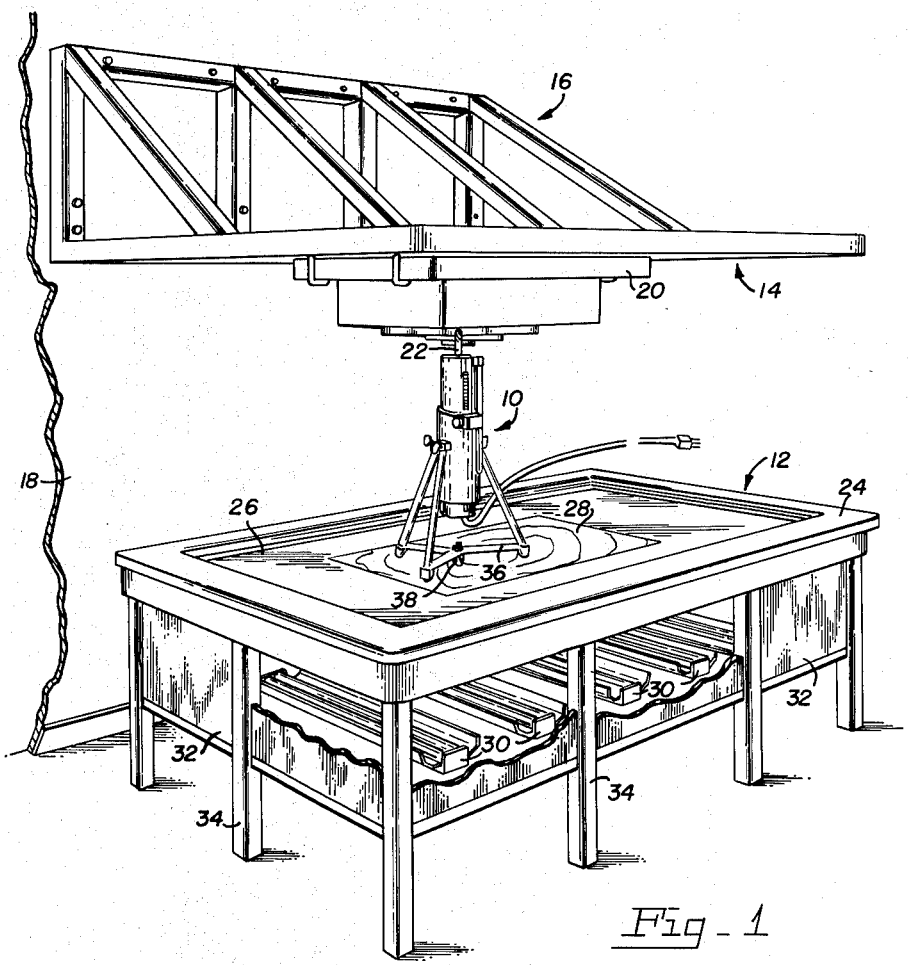
FIG. 1 is a perspective view of an exemplary embodiment of the invention showing a cantilevered platform holding the blank from which the model is cut, a light table having a contour map placed thereon, and the cutting apparatus upon the light table.

Referring now to the drawing, and particularly to FIG. 1 thereof, there is shown a contour cutting device 10 movable over the top surface of a lower platform 12. There is further shown an upper platform 14, supported by a cantilevered structure 16 fastened to a wall 18, which securely holds a work piece 20, also referred to as a model blank, to its lower surface. Cutting device 10 is provided with a rotating tool bit or cutter 22 for engaging work piece 20 in a manner hereinafter described.

Platform 12 may comprise the table top of a free standing table whose upper surface 24 is horizontal and includes a transparent or translucent insert 26 upon which a contour map 28 is placed. Supported below insert 26 are a number of light sources 30 arranged to throw light in an upward direction to illuminate insert 26 from below in a manner usually associated with conventional light tables. Light sources 30 may comprise tubular lamps disposed in upwardly directed reflectors and a box-like housing 32 may be supported by legs 34 to shield the room from extraneous light of sources 30.

In this manner, a suitable light table is provided upon which contour map 28 is placed in a reversed manner, that is, the surface of contour map 28 is placed downwards upon insert 26 so that, by means of light from light sources 30, a visual indication of the "negative" of the contour map may be had.

Cutting device 10 includes a tripod-like frame 36 having ball casters or the like so that device 10 may be easily moved over every part of upper surface 24, and particularly over the portion occupied by contour map 28. Movable frame 36 also carries a stylus 38 which is selected to have the same outside dimension as tool bit 22 and which is axially aligned therewith so that the path of tool bit 22 corresponds to that of stylus 38.

While platform or work piece support 14 is shown cantilevered from wall 18, it is likewise within the contemplation of this invention to support the same from the ceiling or in any other convenient manner to provide an upper platform having a lower surface parallel to upper surface 24 (which is usually horizontal and parallel to the floor).

While, generally speaking, upper platform 14 is fixed in location, the same is not true of the lower platform provided by table 12. In fact it is one of the features of this invention that lower platform 12 is independent of upper platform 14 and may be moved to some other location so that it, or the space beneath platform 14, may be utilized in any other convenient manner. It is also to be noted that platform 14 need not be a solid platform as shown but may be an open frame structure capable of engaging clamps to hold a work piece in parallel relation to the surface of table 12. In this connection it is readily seen that a work piece holder may be suspended from the ceiling by a column if minimum space requirements are to be met.

Referring now more specifically to FIGS. 2–5, there is shown cutting device 10 comprising an inner tubular sleeve 44 slidingly accommodated in an outer tubular sleeve 46. As best seen in FIG. 3, outer sleeve 46 is provided with an internal longitudinal keyway 48 and inner sleeve 44 has affixed to its outer surface a key 50 parallel to the sleeve axis and dimensioned for sliding accommodation in keyway 48. Key 50 may extend along a substantial portion of the peripheral surface of inner sleeve 44 or may comprise one or more short sections. The purpose of the key and keyway arrangement is to prevent relative angular displacement between the inner and outer sleeve.

Inner sleeve 44 is also provided, along its outer surface, with a plurality of parallel teeth to form a rack 52. The teeth may be cut directly into the surface of inner sleeve 44 as shown in the drawing to form a rack integral with sleeve 44, or instead, a toothed rack may be mounted to the surface of inner sleeve 44 in which case the rack may take over the function of key 48 making key 50 and keyway 48 unnecessary.

The upper section of inner sleeve 44 is provided with a slot 54 straddled by a pair of opposite clamping members 56 rigid with the sleeve to form an inner sleeve clamping means. The clamping members are respectively provided with an axially aligned threaded opening and bore 58 so that a wing nut or the like may be utilized in a conventional manner for clamping.

A router, having a router motor 60 and a router output shaft 62 releasably carrying tool bit 22, is clamped securely into inner sleeve 44 by the above described clamping means to become substantially integral therewith. In this manner, inner sleeve 44 becomes a router motor holder.

Outer sleeve 46 is provided with an external housing 64 which supports a shaft 66 having a knurled hand knob 68 for turning. Integral with shaft 66 is a pinion 70 having teeth suitably matching rack 52. An access slot 72, suitably located in the tubular wall of outer sleeve 46, permits pinion 70 to engage rack 52.

Outer sleeve 46 is also provided with three substantially identical radial bosses 74 each having a dead ended bore 76 dimensioned for receiving the tubular leg members 78. To provide means of adjustment, each boss 74 is provided with a threaded opening communicating with bores 76 for engaging a set screw 80, which upon turning, clamps each leg member 78 in a fixed position.

Movable frame 36 comprises a substantially Y-shaped flat horizontal frame member 82 having caster holders 84 affixed to each of its extremities. Caster holders 84 are provided with dead-ended bores 86 aligned with suitable communication openings in frame member 82 which are dimensioned to receive the lower portion of leg members 78. Set screws 90, in a threaded opening 88 which communicating with dead-ended bore 86, permits leg members 78 to be securely clamped into place with respect to movable frame 36. This support means for outer sleeve 46 may also be referred to as a tripod mount.

Each caster holder 84 includes a reception bore 92 dimensioned for accommodating a suitable ball caster 94. Axial with sleeve 44 and integral with frame member 82 is a stylus receiving means 98, such as a Jacobs chuck, for releasably engaging stylus 38.

The upper section of outer sleeve 46 is provided with a slot 100 straddled by a pair of clamping members 102 rigid with the outer sleeve to provide an outer sleeve clamping means. Clamping members 102 are respectively provided with an axially aligned bore and threaded opening for engaging a clamping screw allowing outer sleeve 46 to clamp inner sleeve 44 against axial movement.

There is also provided, as best seen in FIG. 5, a scale support 104 mounted rigid with inner sleeve 44 and spaced therefrom to extend downwardly over the outer sleeve. Outer sleeve 46 is provided with scale indicating means 106, such as a hair line or a pair of opposed pointers, positioned to cooperate with scale support 104. Carried by scale support 104 is a demountable scale 108 which is prepared in accordance with the particular contour to be cut and which is placed in such a manner that indicating means 106 is opposite a zero scale indication either at the lowest or at the highest contour to be cut. The scale divisions are prepared so that each division conveniently corresponds to the difference in the scale height of two adjacent contours of the contour map. It has been found convenient to utilize an adhesive backing for the scale so that the same may easily and readily be attached to or detached from scale support 104.

Referring now to the operation of this invention, a suitable work piece, such as 20, is clamped to upper platform 14 and a light table, such as 12, is moved directly underneath the work piece. Lights are switched on and a contour map 28 is placed over the translucent center piece of platform 12 directly beneath work piece 20.

Thereafter, contour cutting device 10 is assembled by first placing movable frame 36 upon table 12, inserting tripod legs 78 and clamping them in place by set screws 90. Thereafter the structure comprising inner and outer sleeves 44 and 46 (or just outer sleeve 46) is set upon legs 78 and the legs are clamped in such a manner that the axis of router motor 60 is perpendicular to the surface of table 12. Small adjustments for proper perpendicularity may be made by suitable adjustment with the aid of clamping screws 80.

If it is desired to commence operations with the highest contour line, tool bit 22 is lowered until it comes in contact with the selected lowest portion of work piece 20 by turning knob 68. Meanwhile, a suitable scale 108 is prepared with division which corresponds to the model scale of adjacent contour lines, that is to say, scale 108 is provided with a division for each contour line to be cut. Scale 108 is then adhesively or otherwise affixed upon scale support 104 in such a position that the zero mark lies across indexing means 106 with the divisions extending below the indexing mark so that inner sleeve 44 may be raised to the next indexed division for cutting the next adjacent contour. Of course, when starting with the lowest portion of the topographical model, the opposition procedure is adopted which means that inner sleeve 44 is raised to a position corresponding to the base of the topographical model and the scale is affixed to slide 104 in such a manner that the division extends above indexing means 106.

During the cutting of each contour line inner sleeve 44 is securely clamped by the outer sleeve clamping means and cutting device 10 is moved such that stylus 38 traces the contour line to be cut on the contour map. After each contour line is cut, the outer sleeve clamping means is opened, knob 68 is turned until indexing means 106 is opposite the next division of scale 108, and inner sleeve 44 is again clamped in position for cutting the next contour line.

It is to be noted that cutting device 10 is very compact and very light and may be removed readily from table 12, one man being sufficient to carry the same. Further, cutting device 10 is easily disassembled for storage and again assembled for use. Also, table 12 may be left where it is and utilized for other work or may be moved to some other location. It is also to be noted that table 12 is entirely free standing and therefore accessible from all four sides so that greater facility is had in moving cutting device 10 over the contour line of contour map 28.

There has been described hereinabove a method and apparatus for cutting topographical models from a positive print contour map which does not require a permanent setup in which platforms are connected. Instead an entirely free standing table is utilized. The cutting device itself is easily assembled for work and disassembled for storage and is provided with a height indexing means making height adjustment for cutting successive contour line very simple.

What is claimed is:

1. The method of cutting a topographical model from a contour map comprising the steps of:
  (a) suspending the work piece from which the model is to be cut to the underside of a substantially horizontal platform;
  (b) placing a transparent, substantially horizontal, free standing surface below the suspended work piece and illuminating the transparent surface from below;
  (c) placing the positive print of the contour map face down upon the transparent surface so that the contour lines visible from above are reversed;
  (d) movingly supporting a vertically extensible and horizontally slidable contour cutter means upon the print covered transparent surface and following each reversed contour line; and
  (e) successively adjusting the vertical height of the contour cutter means to correspond to the successive contour lines to be cut.

2. The method of cutting a topographical model from a contour map comprising the steps of:
  (a) freely suspending a work piece to the underside of a substantially horizontal upper platform supported from above;
  (b) placing a substantially horizontal free standing lower platform, supported from below, underneath the suspended work piece;
  (c) placing the contour map upon the upper surface of the lower platform;
  (d) placing an axially extensible and horizontally freely slidable contour cutter means upon the contour map for movement thereover; and
  (e) successively adjusting the vertical height of the contour cutter means corresponding to the contour lines of the contour map by axially displacing the cutter portion of the cutter means with respect to the slidable base portion of the cutter means while cutting each successive contour by moving the contour cutter along each contour line.

3. The method of cutting a topographical model from a contour map comprising the steps of:
  (a) freely suspending a work piece to the underside of a substantially horizontal platform;
  (b) locating a transparent substantially horizontal surface below the suspended work piece and illuminating the transparent surface from below;
  (c) placing the contour map face down upon the transparent surface;
  (d) placing a vertically extensible and horizontally slidable contour cutter means upon the contour map for movement thereover; and
  (e) successively cutting each contour line by moving the contour cutter means along each contour line while axially extending said cutter means in successive measured steps corresponding to the contour line being cut.

4. The method of cutting a topographical model from a contour map comprising the steps of:
  (a) freely suspending a work piece to the underside of a substantially horizontal upper platform;
  (b) placing a light transmitting and substantially horizontal lower platform which is entirely independent of the upper platform beneath the suspended work piece and illuminating the same from below;
  (c) placing the contour map face down upon the upper surface of said transparent platform;
  (d) supporting a vertically extensible and horizontally slidable contour cutter means upon the lower platform for movement thereover;
  (e) preparing a scale having division corresponding to the scale height of each successive contour line of the contour map;
  (f) affixing the scale to the contour cutter means such that the position of extension of the contour cutter means is readily visible by reference to the scale;
  (g) successively adjusting the extension of the contour cutter means by reference to the divisions on the scale; and
  (h) cutting each successive contour by moving the contour cutter means along each contour line.

5. A contour cutting device freely movable over a horizontal platform over a contour map placed thereon for cutting a work piece suspended above the platform, said contour cutting device comprising:
  (a) a first tubular member including a releasable clamping means;
  (b) a second tubular member having an interior bore dimensioned for slidingly receiving said first member, said second member including releasable clamping means for clamping said first member;
  (c) rack and pinion means cooperatively associated with said first and second member for controlled relative axial displacement therebetween;
  (d) key and keyway means associated with said first and second member for confining relative motion between said first and second member to axial displacement;
  (e) frame means connected to said second member and including frictionless caster means for engaging the horizontal platform;
  (f) a router means carried by said first tubular member and securely clamped in place by its clamping means;
  (g) a stylus releasably carried by said frame means and coaxial with the tool bit of said router means for guiding said cutter device along the contour line of the contour map;

(h) a vertical scale support and scale pointer means cooperatively carried by first and second member; and (i) a scale releasably affixed to said scale support means, said scale having divisions corresponding to the contour line of the contour map to provide a ready indicating means when adjusting the relative axial displacement between said first and second member by actuating said rack and pinion means.

6. A contour cutting device freely movable over a horizontal platform over a contour map placed thereon for cutting a work piece suspended above the platform in accordance with the contour lines of the contour map, said device comprising:

(a) a first tubular member including a releasable clamping means;

(b) router means carried by said first member and held securely in place in axial alignment with said first member by said clamping means;

(c) a second tubular member having an interior bore dimensioned for slidingly receiving said first member, said second member including releasable clamping means for clamping said first member;

(d) rack and pinion means cooperatively associated with said first and second member for adjusting their relative axial position;

(e) key and keyway means cooperatively associated with said first and second member for confining motion therebetween to axial displacement;

(f) means for movably supporting said second member, said means including three frictionless caster means for platform engagement, a base member carrying said caster means, and a plurality of connecting members, one end of each said connecting members releasably engaging said base member and the other end releasably engaging said second member;

(g) stylus means releasably carried by said base member and coaxial with said first member;

(h) a scale support means rigid with and spaced from said first member and depending downwardly over said second member;

(i) a scale pointer means rigid with said second member and cooperating with said scale support means; and (j) a scale releasably affixable to said scale support means to indicate the relative axial position between said first and second member.

7. A contour cutting device which is freely movable over a platform to follow contour lines of a contour map placed thereon and which includes a rotating tool bit for performing work upon a work piece suspended above the cutting device, said contour cutting device comprising:

(a) a pair of members in sliding engagement along an extension axis perpendicular to the platform, said pair of members including means for confining relative motion therebetween to sliding motion along said extension axis, said pair of members further including rack and pinion means for providing adjusting means to change axial position of one member relative to the other, and one of said members carrying a releasable clamping means to clamp the other member;

(b) a router means including the tool bit carried by one of said members, said last mentioned member including releasable clamping means to securely engage said router means so that the axis of the tool bit is parallel to said extension axis;

(c) a support structure for supporting the other of said member for motion over the platform, said support means including caster means for platform engagement; and (d) scale means for providing an indication of relative axial position of said members, said scale means including a scale support rigid with one member and extending parallel to said extension axis, and a scale pointer rigid with the other member and cooperating with said scale support, and a detachable scale supported upon said scale support.

8. A contour cutting station comprising:

(a) an upper platform;

(b) a lower platform entirely independent of and substantially parallel to said upper platform and including a light transmitting surface and a light source for illuminating said light transmitting surface from below;

(c) a work piece releasably clamped to the lower surface of said upper platform;

(d) a positive print contour map placed face down upon said light transmitting surface;

(e) a pair of members in sliding engagement along an extension axis, said pair of members including means for confining relative motion therebetween to sliding motion along said extension axis, said pair of members further including rack and pinion means for adjusting the axial position of one member relative to the other, and one of said members including a releasable clamping means to clamp said member to the other member;

(f) a router means including a tool bit carried by one of said members, said last mentioned member including releasable clamping means to securely engage said router means so that the axis of the tool bit is parallel to said extension axis;

(g) a support structure for supporting the other of said members for motion over said lower platform with said extension axis perpendicular to said platforms, said support means including caster means for engaging said lower platform; and (h) scale means for providing an indication of relative axial position of said members, said scale means including a scale support rigid with one member and extending parallel to the extension axis, and a scale pointer rigid with the other member and cooperating with said scale support, and a detachable scale supported upon said scale support.

References Cited by the Examiner

UNITED STATES PATENTS

| | | | |
|---|---|---|---|
| 429,213 | 6/1890 | Jacobson | 90—13 |
| 645,382 | 3/1900 | Brown | 90—12 |
| 877,894 | 1/1908 | Kelley. | |
| 1,742,217 | 1/1930 | Renwick. | |
| 1,745,780 | 2/1930 | Casey. | |
| 1,874,232 | 8/1932 | Groene et al. | 90—12 |
| 1,907,250 | 5/1933 | Shaver | 90—13 |
| 2,693,737 | 11/1954 | Smith | 90—13 |
| 2,855,963 | 10/1958 | Potter. | |
| 3,137,209 | 6/1964 | Green et al. | 90—13.1 |

FOREIGN PATENTS 1,021,976   12/1952   France.

WILLIAM W. DYER, Jr., *Primary Examiner.*

LEON PEAR, *Examiner.*

G. A. DOST, *Assistant Examiner.*